US010519930B2

(12) United States Patent
Kjær et al.

(10) Patent No.: US 10,519,930 B2
(45) Date of Patent: Dec. 31, 2019

(54) WIND TURBINE CONTROLLER WITH PITCH FEEDBACK CONTROL LOOP IN PARTIAL LOAD

(71) Applicant: VESTAS WIND SYSTEMS A/S, Aarhus N (DK)

(72) Inventors: Martin Ansbjerg Kjær, Harlev J (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 300 days.

(21) Appl. No.: 15/321,817

(22) PCT Filed: Jun. 22, 2015

(86) PCT No.: PCT/DK2015/050177
§ 371 (c)(1),
(2) Date: Dec. 23, 2016

(87) PCT Pub. No.: WO2015/197071
PCT Pub. Date: Dec. 30, 2015

(65) Prior Publication Data
US 2017/0152836 A1    Jun. 1, 2017

(30) Foreign Application Priority Data
Jun. 26, 2014    (DK) .................................. 2014 70387

(51) Int. Cl.
*F03D 7/02* (2006.01)
*F03D 17/00* (2016.01)
(Continued)

(52) U.S. Cl.
CPC .......... *F03D 7/0224* (2013.01); *F03D 1/0675* (2013.01); *F03D 7/028* (2013.01);
(Continued)

(58) Field of Classification Search
CPC ...... F03D 7/0224; F03D 17/00; F03D 1/0675; F03D 7/047; F03D 7/028; G05B 19/402;
(Continued)

(56) References Cited

U.S. PATENT DOCUMENTS

2006/0132993 A1*   6/2006   Delmerico ............ F03D 7/0284
                                                            361/20
2007/0075546 A1*   4/2007   Avagliano ............. F03D 7/0224
                                                            290/44
(Continued)

FOREIGN PATENT DOCUMENTS

CN          201461236 U       5/2010
CN          102705169 A      10/2012
(Continued)

OTHER PUBLICATIONS

International Search Report for PCT/DK2015/050177, dated Aug. 28, 2015.
(Continued)

*Primary Examiner* — Thomas C Lee
*Assistant Examiner* — Charles Cai
(74) *Attorney, Agent, or Firm* — Patterson + Sheridan, LLP

(57) ABSTRACT

The control of the power output of wind turbine generator that operates in a derated mode to generate a produced power output level lower than an available power level. A pitch system sets the blade pitch of a rotor to a pitch value based on the received power reference signal. A power system controls the produced power output level of the wind turbine to the requested power output level. Moreover, the blade pitch of the rotor is further controlled by a pitch feedback control loop that modifies the pitch value based on a difference between the produced power output level and the requested power output level.

14 Claims, 4 Drawing Sheets

(51) Int. Cl.
  *F03D 1/06* (2006.01)
  *F03D 7/04* (2006.01)
  *G05B 19/402* (2006.01)
(52) U.S. Cl.
  CPC .............. *F03D 7/047* (2013.01); *F03D 17/00* (2016.05); *G05B 19/402* (2013.01); *F05B 2220/706* (2013.01); *F05B 2270/1033* (2013.01); *F05B 2270/32* (2013.01); *F05B 2270/335* (2013.01); *F05B 2270/504* (2013.01); *G05B 2219/2619* (2013.01)
(58) Field of Classification Search
  CPC .......... G05B 2219/2619; Y02E 10/725; Y02E 10/721; Y02E 10/723; F05B 2270/32; F05B 2270/335; F05B 2270/504; F05B 2220/706; F05B 2270/1033; F05B 2270/703; F05B 2270/309
  See application file for complete search history.

(56) References Cited

U.S. PATENT DOCUMENTS

| | | | | |
|---|---|---|---|---|
| 2007/0205602 | A1* | 9/2007 | Willey | F03D 7/0224 290/44 |
| 2010/0133817 | A1 | 6/2010 | Kinzie et al. | |
| 2011/0273129 | A1* | 11/2011 | Coe | H02J 7/007 320/101 |
| 2011/0301769 | A1* | 12/2011 | Lovmand | F03D 7/028 700/287 |
| 2014/0246855 | A1* | 9/2014 | Vasak | G01R 31/42 290/44 |
| 2014/0306451 | A1* | 10/2014 | Abdur-Rahim | F03D 7/0224 290/44 |
| 2015/0005966 | A1* | 1/2015 | Gerber | F03D 7/042 700/287 |

FOREIGN PATENT DOCUMENTS

| | | |
|---|---|---|
| DE | 102005029000 A1 | 12/2006 |
| WO | 2010000648 A2 | 1/2010 |
| WO | 2012019613 A1 | 2/2012 |
| WO | 2014026688 A1 | 2/2014 |

OTHER PUBLICATIONS

Danish Search Report for PA 2014 70387, dated Jan. 22, 2015.
SIPO of the People's Republic of China Notification of First Office Action dated Jul. 4, 2018 for Application No. 201580034828.1.

* cited by examiner

WIND TURBINE CONTROLLER WITH PITCH FEEDBACK CONTROL LOOP IN PARTIAL LOAD

FIELD OF THE INVENTION

The present invention generally relates to control of wind turbines and, more specifically, to controlling the power output of wind turbine generators under derated operating conditions.

BACKGROUND OF THE INVENTION

In general, a wind turbine or a wind farm is operated with the aim to obtain maximum yield of the capital invested in it, and consequently the wind turbine control systems are configured to maximize the output power, i.e. to operate the wind turbine to capture the maximum power that is available in the wind, with due regard to keeping the wind turbine within load limits.

Nevertheless, there may be situations where there is a desire to operate the wind turbine in a manner where the requested output power is actually lower than an available power in the wind. This is referred to as derated operation, curtailed operation, and other terms are also used in the art. Derated operation may be desired for a number of reasons, one being an interest in having a power buffer which may be injected into the grid, e.g. in connection with frequency control.

Derated operation may be done in a number of ways, and a wind turbine may even implement more than one method, in particular one method may be used when operating in full load where the wind allows for full power production, and another method may be used in partial load where the wind only allows for partial power production, as compared to the rated power production of the wind turbine. For a wind turbine with variable pitch, this relates to that in partial load, the primary control is based on speed control by adjusting a load torque provided to the rotor by the generator coupled to the rotor, whereas in full load the primary control is based on active pitching.

WO 2010/000648 A2 discloses a method of operating a wind turbine in curtailed mode, where in partial load a curtailment is obtained, by offsetting the pitch value from an optimal pitch value to thereby capture less energy from the wind than what is available.

However, there is general a need in the art to provide further and improved ways of operating wind turbines in a derated manner.

SUMMARY OF THE INVENTION

It would be advantageous to achieve improved ways of operating a wind turbine in a derated manner. Moreover, it would be desirable to provide improved ways of operating a wind turbine in a derated manner which takes into account the risk of increasing loads experienced by the turbine when operating in a derated manner, as well as to provide improved ways of operating a wind turbine in a derated manner which improves the control of the produced derated power.

Accordingly, in a first aspect, there is provided a method of controlling a wind turbine that n operation generates a produced power output level, the method comprising:

receiving a power reference signal in a wind turbine controller that defines a requested power output level lower than an available power level;

setting a blade pitch of a rotor of the wind turbine to a pitch value based on the received power reference signal that causes the rotor to capture wind power that is approximately equal to the requested power output level;

controlling the produced power output power level of the wind turbine to the requested power output level by adjusting a load torque provided to the rotor by a generator coupled to the rotor; and wherein the blade pitch of the rotor is further controlled by a pitch feedback control loop that modifies the pitch value based on a difference between the produced power output level and the requested power output level.

A method is provided which in a derated control situation, sets an appropriate pitch of the rotor blades that causes the rotor to capture wind power that is approximately equal to the requested power output level, while controlling the produced power by adjusting a load torque from the generator. This is a partial load type controller which provides a derated output power by offsetting the pitch angle from an optimal angle.

Derated operation may bring the turbine into a situation where either one of the partial load controller and the full load controller can be used for operating the wind turbine to produce the requested power, and this may lead to an increase in the number of shifts between full load and partial load control. Embodiments of the present invention have the advantage that frequent shifts from full load control to partial load control may be avoided. Such shifts increase the load exposure of the wind turbine, and avoidance or reducing such shifts can increase the life time of a turbine. However, by derating the output power based on a pitch offset may suffer from the problem that the correspondence between pitch angle and output power level is based on model calculation and is not necessarily precise and potentially exposed to offsets and drifts. Therefore the derated output power level cannot necessarily be controlled precisely when using the partial load controller. However by further controlling the pitch value by a pitch feedback control loop it is ensured that any offsets, drift, inaccuracies, etc. in the output power is automatically compensated for.

In further aspects, the method is implemented into a controller for a wind turbine, as well as into a wind turbine for controlling the power output of wind turbine generators under derated operating conditions. The controller may comprise a processor and a memory including instructions that, when executed by the processor, cause the processor to perform the method of the first aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of a control system together with elements of a wind turbine.

DESCRIPTION OF EMBODIMENTS

Figure 1:
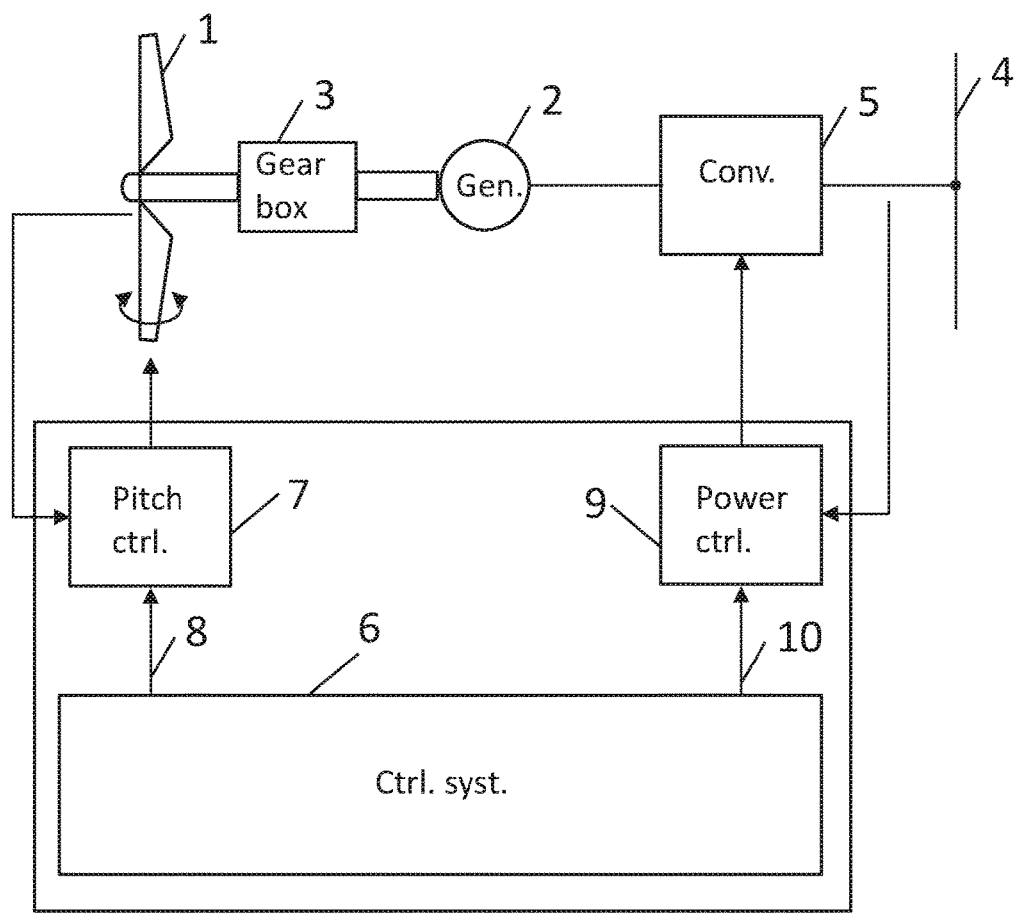

FIG. 1 schematically illustrates an embodiment of a control system together with elements of a wind turbine. The wind turbine comprises rotor blades 1 which are mechanically connected to an electrical generator 2 via gearbox 3. The electrical power generated by the generator 2 is injected into a power grid 4 via an electrical converter 5. The electrical generator 2 can be a doubly fed induction generator, but other generator types may be used.

The control system comprises a number of elements, including at least one controller 6 with a processor and a memory, so that the processor is capable of executing computing tasks based on instructions stored in the memory. In general, the wind turbine controller 6 ensures that in operation the wind turbine generates a requested power output level. This is obtained by adjusting the pitch angle and/or the power extraction of the converter. To this end, the control system 6 comprises a pitch system including a pitch controller 7 using a pitch reference 8, and a power system including a power controller 9 using a power reference 10. The wind turbine rotor thus comprises rotor blades that can be pitched by a pitch mechanism. The rotor may either comprise a common pitch system which adjusts all pitch angles on all rotor blades at the same time, or the rotor may comprise an individual pitch system which is capable of individual pitching of the rotor blades. In the figure two rotor blades are shown, however any number of rotor blades may be used, in particular three rotor blades.

Figure 2:
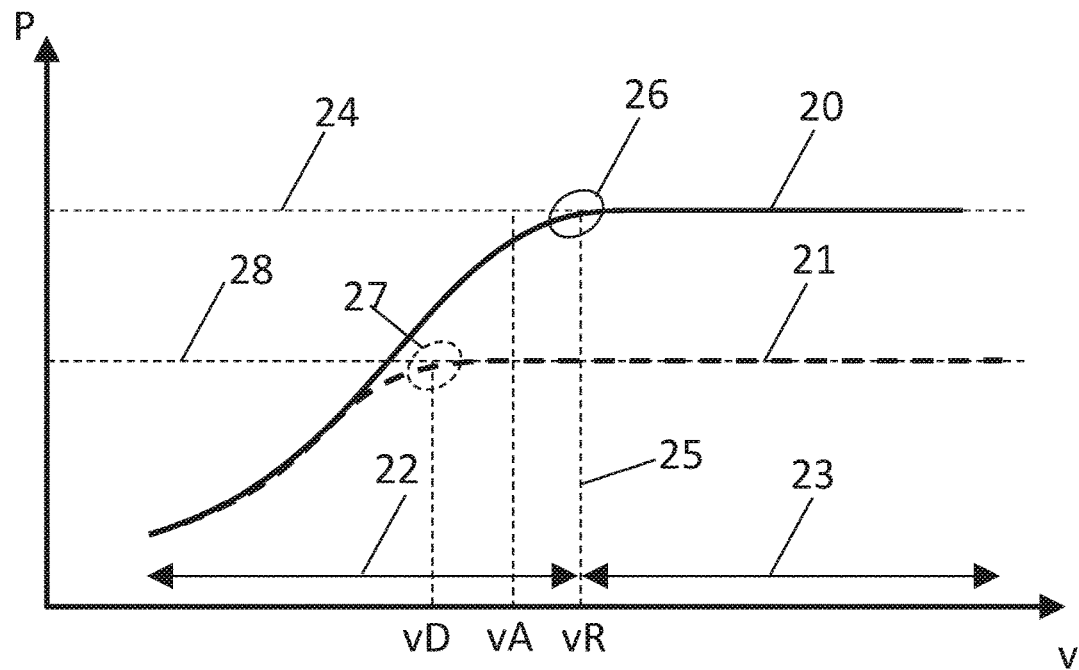
FIG. 2 illustrates schematic power curves.

FIG. 2 illustrates schematic power curves 20, 21. A wind turbine is often operated according to an overall control strategy which uses two distinct regions, the partial load region 22 and the full load region 23. The power curve 20 shows the available power output level, P, as a function of the wind speed, v, for a given turbine in accordance with its design rating. The two regions are defined in accordance with the rated power level 24 of the wind turbine, so that the wind turbine is operated by a partial load controller when the measured wind speed is below the rated wind speed vR 25, so that the wind turbine produce less than the rated power 24, whereas the wind turbine is operated by a full load controller when the measured wind speed is above the rated wind speed 25, so that the wind turbine produce the rated power 24. In partial load control, the output power is controlled mainly by the power controller 9, whereas in full load control, the output power is controlled mainly be the pitch controller 7.

A turbine may be requested to produce a power output level 28 which is lower than the available power level 24, i.e. to operate in a derated or curtailed mode. A consequence of derating the wind turbine may be that the switching point 26, 27 between partial load and full load regions, moves from the area around the rated wind speed 25 to a different, lower, wind speed.

The requested derated production need not come as a steady value, and set-points for a requested power may change as often as between several times per second and every few minutes, and as a consequence of this, the switching point between partial load control and full load control may change as well. In a situation where the requested power and/or the available power is lower than the rated power, i.e. the available wind speed is lower than the rated wind speed, this may be a problem. In particular, if the turbine receives a power set-point which is based on the available power since in this situation the turbine will operate around the switching points leading to an increased number of switches between partial load and full load control. Shifting from partial load to full load control, and vice versa, imposes increased load on the turbine. The power set-point may be based on the available power e.g. by setting the power set-point as a fixed percentage of the available power, as a fixed amount below the available power, or by any other suitable means.

Figure 3:
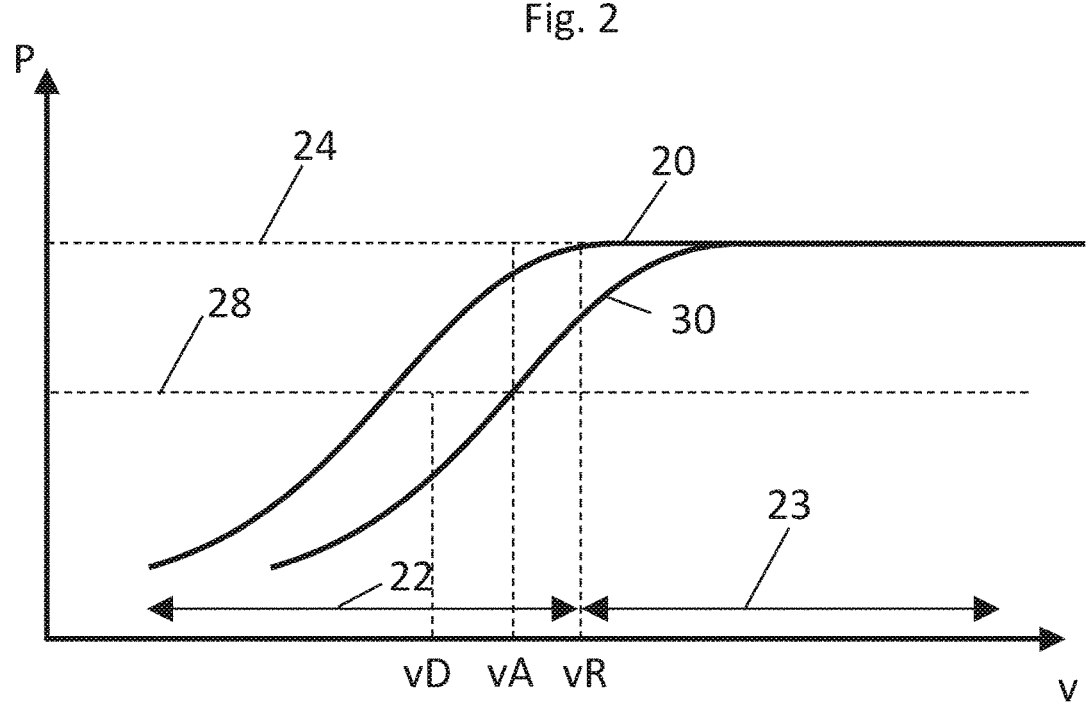
FIG. 3 schematically illustrates the available power curve and a partial load derated power curve for a wind turbine in accordance with an embodiment of the invention.

FIG. 3 illustrates a way of reducing the number of switching instances when operating in derated mode. The figure illustrates the available power curve 20 and a partial load derated power curve 30 for the wind turbine in accordance with an embodiment of the invention. As an example, a request is received by the wind turbine controller to operate the wind turbine at a derated power level 28, and in response to this, the wind turbine controller generates a partial load derated power curve 30 by shifting the available power output curve 20 to the right, i.e. to higher wind speeds. The power curve 30 is generated by shifting it to higher wind speed until the power curve at the requested power output level 28, i.e. the derated power level, intersects the available wind speed vA. This is in contrast to a conventional turbine controller, which generates the derated power output curve by reducing the maximum produced power, as shown in FIG. 2. As a consequence of generating the derated power output curve by shifting the available power curve 30 to the right, the wind turbine controller 6 operates in a partial load control segment 22 of the derated power output curve. Due to the shifting of the power curve, there is no longer an issue with a shifting point between full load and partial load.

The derated power curve 30 is obtained by shifting a copy of the non-derated power curve 20 to exactly overlay the crossing point between the derated power 28 and the available wind vA. However, it is to be understood that the same effect may be obtained by shifting a modified version of the non-derated power curve to a position which substantially overlie the crossing point.

Operation based on the shifted power curve as illustrated in FIG. 3 is in particular advantageous for situations where the available power is less than the rated power, whereas if the available power is higher than the rated power, operation based on a derated power curve 21 as illustrated in FIG. 2 may be selected.

The shift to higher wind speed may be accomplished by offsetting the pitch angle from the optimal setting normally used when operating in the partial load control region. The offset pitch angle causes the rotor to capture less wind power than the optimal pitch setting would. The non-optimal blade pitch shifts the power output curve of the turbine by reducing the power coefficient Cp of the rotor. The wind turbine thereby generates the requested derated power output at wind speeds above vD without entering into the full load control region. As a result, operation based on the partial load derated power curve 30 may reduce the blade pitching activity of the wind turbine when operated under derated operating conditions at wind speeds above vD as compared to conventional wind turbines lacking the partial load derating feature.

In an embodiment, the setting of the blade pitch may comprise determining an actual wind speed, typically by a wind speed measurement and determining the pitch value based on a two-dimensional lookup table which correlates the requested power output level, the tip-speed ratio and the pitch value. That is, the setting of the blade pitch may be based on an inverse Cp calculation. In an embodiment, the inverse Cp calculation may further comprise an observer loop which modifies the calculated inverse Cp value based on a feedback loop that compensates for an error in the calculated inverse Cp value.

Thus in embodiments of the present invention, derating of the power is obtained by setting a blade pitch of a rotor of the wind turbine to a pitch value based on the received power reference signal that causes the rotor to capture wind power that is approximately equal to the requested power output level, and then controlling the produced power output level of the wind turbine to the requested power output level by adjusting a load torque provided to the rotor by a generator coupled to the rotor.

However the correspondence between pitch angle and output power level is based on model calculation and is not necessarily precise and potentially exposed to offsets and drifts. By further controlling the pitch value by a pitch feedback control loop that modifies the pitch value based on a difference between the produced power output level and the requested power output level it is ensured that any offsets, drift, inaccuracies, etc. in the output power is automatically compensated for.

Figure 4:
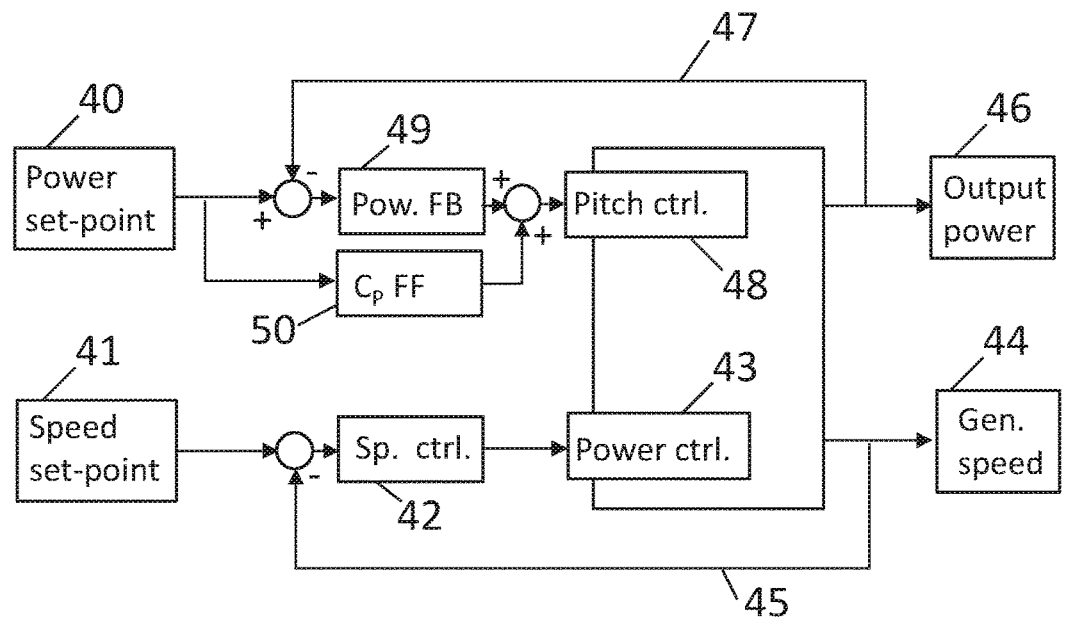
FIGS. 4 and 5 illustrate control structures in accordance with embodiments of the present invention.

FIG. 4 illustrates a control structure in accordance with embodiments of the present invention, where a pitch feedback control loop modifies the pitch value to compensate for differences in the output power due to any small errors in the exact pitch value that was set to capture wind power that is approximately equal to the requested power output level.

The controller receives a requested power output level 40 in the form of a power set-point. Moreover, the controller receives, or calculates, a speed set-point 41. The power set-point is received from an external source, i.e. the plant operator, whereas the speed set-point is based on a determination of the optimal speed based on the requested power in light of the wind speed. The speed is input into a speed controller 42 which forwards the desired power setting to the power controller 43 so that the load torque is adjusted to deliver the desired speed. The resulting generator speed 44 is measured and fed back into the speed controller 42 together with the desired speed 41 to control the speed of the generator. As a result, an output power is produced at a power output level 46.

In a conventional partial load controller the produced power output level 46 would be generated based mainly on the controlling of the speed by adjusting the load torque provided to the rotor by the generator coupling to the rotor, while controlling the pitch value based on the wind speed.

However, in embodiments of the present invention, the pitch value is offset to a pitch value based on the inverse Cp calculation, e.g. by use of a Cp-based feed-forward element 50 which continuously calculates a contribution from changes in the Cp due to changes in the power set-point 40, and determines a contribution to the pitch actuator 48 based on this determination. Additionally, the pitch value is also controlled by a pitch feedback control loop that modifies the pitch value based on a difference between the produced power output level 46 and the requested power output level 40. This is obtained by implementing a power feedback routine 47 which instructs the pitch system 48 to change the pitch value based on an error in the produced power 46 in relation to the requested power 40. The power feedback routine implements a unit 49 which based on power input(s) determine an appropriate pitch value. Due to the feedback loop 47 the pitch value will accommodate to changes which is due to changes in the Cp value due to the varying power set-point. However, as this is a rather slow loop it may be advantageous to use the feed-forward element 50 directly.

The result is that the pitch value is continuously adjusted to ensure that the produced power output level 46 is maintained at the requested power output level.

The pitch feedback control loop is advantageously implemented to change the pitch value on a time scale that is longer than a time scale of controlling the produced power output level. The overall control of a wind turbine is operated on a timescale of seconds, thus advantageously, the pitch feedback control loop is implemented to change the pitch value on a time scale between a few seconds to a few minutes, such as between 5-10 seconds and 1 minute.

This may be obtained by a controller with an integral term that ensures a slow adaptation, such as a PI or I controller with an appropriately set I-level.

By using a slow controller any unwanted dynamics due to transients in the wind speed is avoided.

The control scheme as illustrated in FIG. 4 is most advantageously applied in a steady state, or semi-steady state, situation where a constant or slow varying power set-point 40 is requested.

Figure 5:
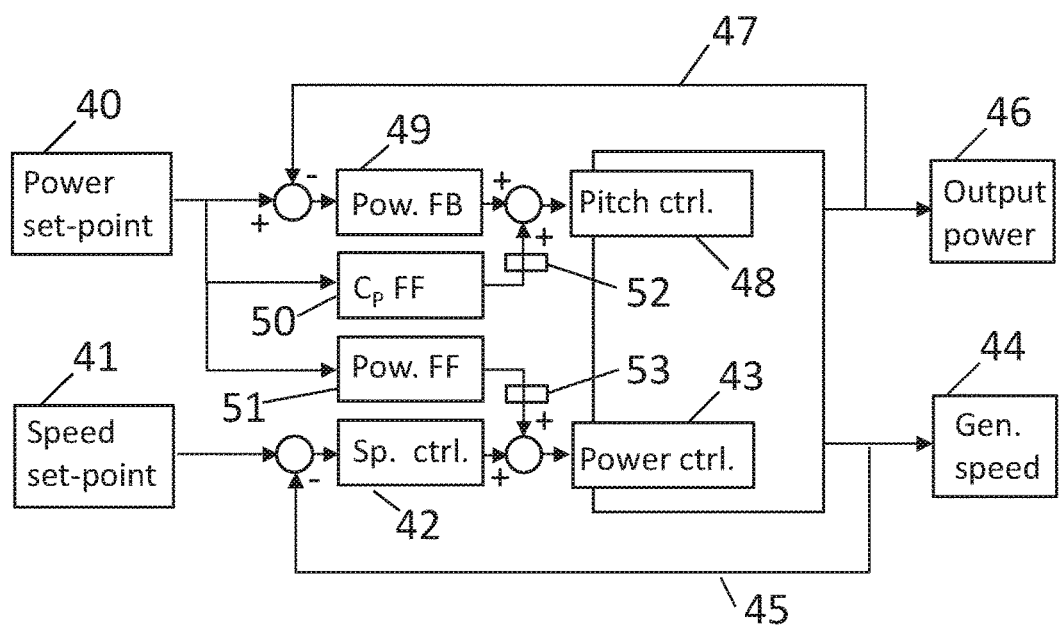

In a situation where a varying external power set-point is applied, the control scheme may advantageously be extended as illustrated in FIG. 5.

FIG. 5 illustrates a control structure in accordance with embodiments of the present invention, which on the one hand ensures steady state accuracy and on the other hand implements feed-forward elements to assist during transients, ramps and other situations where the power set-point vary.

The speed controller 42 will adapt to changes in the speed due to the feedback 45. However during situations where the external power is changed fast, the generator speed may be further controlled by a power feed-forward control 51 that provided a contribution to the power set-point based on the requested power output level.

In this manner the pitch controller 48 and/or the power controller 43 are assisted by feed-forward contributions to adapt to changing power set-points. This may result in a faster adaptation to varying conditions, however, it may also assist in balancing any torque variation between generated rotor torque and generator torque.

During transients it may be important to further ensure a balance between the power intake from the wind and the power taken out by the generator, i.e. to ensure a torque balance. In an embodiment this is obtained by imposing ramp limitations on the pitch signal and/or the power reference to the actuator.

In an embodiment, the rate limiter may be imposed as a pitch rate limit that is imposed on to the rate of change of the pitch value. This may be done by imposing a limit to the Cp-based feed-forward element 50, e.g. by placing a limiting element in the control routine in FIG. 5 as schematically indicated by the element 52.

In an embodiment, the rate limiter may be imposed as a power rate limit that is imposed on to the rate of change of the power set-point. This may be done by in the speed control loop imposing a limit to the power feed-forward control 51, e.g. by placing a limiting element in the control routine in FIG. 5 as schematically indicated by the element 53.

The positioning of the rate limiters 52, 53 are only examples. Other positions may be chosen for various reasons or in connection with specific conditions.

The control routine may implement one or both of the rate limiters, however in an embodiment the pitch rate limit and/or the speed set-point rate limit are fixed to predefined limit(s) that are the fastest rates that are allowed. The rate limit(s) may e.g. be set by requirements to be grid compliant.

In an embodiment, the pitch rate limit is set in dependence on the power set-point rate limit, or vice versa. Setting the two rate limits in dependence on each other may assist in ensuring that the rotor torque and the generator torque are balanced. In such an embodiment, one of the rate limits may be selected to be constant, whereas the other may vary due to variations in the wind, tip speed ratio, etc.

Figure 6:
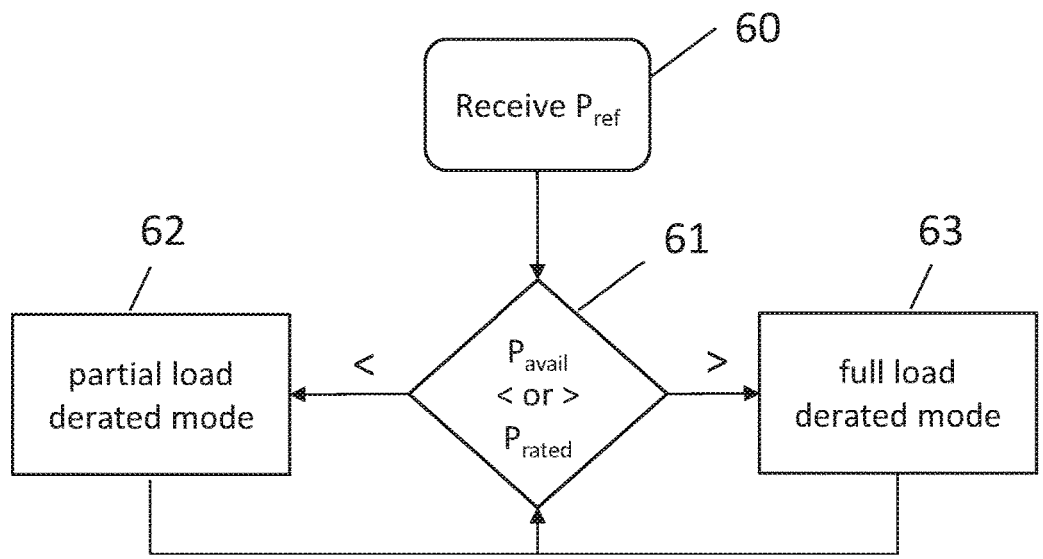
FIG. 6 illustrates an overall flow chart of operating a wind turbine in a derated manner.

FIG. 6 illustrates an overall flow chart of operating a wind turbine in a derated manner.

In a general step 60, the wind turbine controller receives a power reference signal that defines a requested power output level lower than an available power level. That is, the wind turbine is requested to operate in derated mode.

An overall control loop 61 determines whether or not the available power level is above or below the rated power level. The rated power is a design feature of the given turbine.

If the available power level is below the rated power level, the wind turbine is controlled to operate in partial load derated mode 62, and alternatively if the available power level is above the rated power level, the wind turbine is controlled to operate in full load derated mode 63.

In derated partial load control mode, the wind turbine is operated in accordance with the power curve 30 as shown in FIG. 3, whereas in derated full mode, the wind turbine may be operated in accordance with the power curve 20 as shown in FIG. 2.

In derated partial load control mode 62, the blade pitch of a rotor of the wind turbine may be offset to a pitch value based on the derated power level while controlling the produced power output level of the wind turbine by controlling the speed of the rotor by adjusting the load torque of the a generator together with, in accordance with embodiments of the present invention, a pitch feedback control loop that modifies the pitch value based on a difference between the produced power output level and the requested power output level.

In derated full load control mode 63, the generator speed and load torque provided to the rotor by a generator coupled to the rotor is set based on the derated power level, and the derated power level is maintained by adjusting the pitch value of the rotor.

In embodiments, derated full load may be implemented in different ways.

Figure 7:
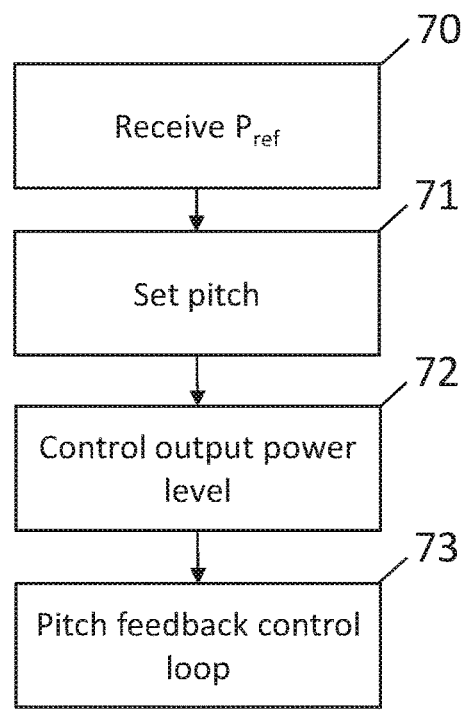
FIG. 7 illustrates a flow chart with elements for performing embodiments of the present invention to control a wind turbine to generate a produced power output level.

FIG. 7 illustrates a flow chart with elements for performing embodiments of the present invention to control a wind turbine to generate a produced power output level.

In a first step 70 a power reference signal is received in a wind turbine controller. The power reference signal defines a requested power output level lower than an available power level. That is, the wind turbine is requested to operate in derated mode.

In a subsequent step 71, a blade pitch of a rotor of the wind turbine is set to a pitch value based on the received power reference signal that causes the rotor to capture wind power that is approximately equal to the requested power output level. The rotor is thus set to capture less wind power than what is available in the wind.

In a next step 72, the produced power output level of the wind turbine is controlled to the requested power output level by adjusting a load torque provided to the rotor by a generator coupled to the rotor.

In a final step 73, the blade pitch of the rotor is further controlled by a pitch feedback control loop to modify the pitch value based on a difference between the produced power output level and the requested power output level. The pitch feedback control loop thus modifies the pitch value to assist n minimizing any difference in requested power and produced power.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

What is claimed is:

1. A method of controlling a wind turbine that in operation generates power at a produced power output level, the wind turbine comprising a rotor coupled to at least one rotor blade, the method comprising:
   receiving a power reference signal in a wind turbine controller that defines a requested power output level that is less than an available power level;
   setting a blade pitch of the rotor blade to a pitch value based on the received power reference signal, the pitch value associated with a captured wind power that is approximately equal to the requested power output level; and
   controlling, based on a power curve in accordance with a determined wind speed, the produced power output level of the wind turbine to correspond to the requested power output level by adjusting a load torque provided to the rotor by a generator coupled to the rotor; and
   wherein, when the requested power output level is greater than the available power level, the produced output power level is controlled according to a non-derated power curve,
   wherein, when the requested power output level is less than the available power level, the produced output power level is controlled according to the non-derated power curve that is shifted to a higher wind speed; and
   wherein the blade pitch of the rotor blade is further controlled by a pitch feedback control loop that modifies the pitch value based on a difference between the produced power output level and the requested power output level.

2. The method according to claim 1, wherein the power reference signal is based on the available power level.

3. The method according to claim 1, wherein the wind turbine is operated in accordance with a rated power output level, and wherein the power reference signal is below the rated power output level.

4. The method according to claim 1, wherein the pitch feedback control loop modifies the pitch value on a time scale that is longer than a time scale of controlling the produced power output level.

5. The method according to claim 1, wherein the pitch feedback control loop includes controlling the pitch value modification based on an integral term.

6. The method according to claim 1, wherein setting the blade pitch comprises:

determining the pitch value based on a two-dimensional lookup table which correlates at least: the requested power output level, a tip-speed ratio, and the pitch value.

7. The method according to claim 1 wherein the blade pitch of the rotor is further controlled by a pitch feedback control loop that modifies the pitch value based on a difference between the produced power output level and the requested power output level using a feed-forward term based on a Cp determination that is further based on the requested power.

8. The method according to claim 1, wherein the power output level is further controlled by a speed control loop that minimizes a difference between a generator speed set-point and a measured speed of the generator; and
wherein the generator speed is controlled by a feed-forward control element that modifies a power set-point to a power controller based on the requested power output level.

9. The method according to claim 7, wherein the blade pitch is limited by a rate of change of the pitch value to a pitch rate limit.

10. The method according to claim 8, wherein a rate of change of the-power set-point is limited to a power rate limit.

11. The method according to claim 10, wherein the rate of change of the power set-point is limited to a power rate limit, and at least one of: the pitch rate limit, and the power rate limit are fixed to predefined limits.

12. A method of controlling a wind turbine that in operation generates power at a produced power output level and which is operated in accordance with a rated power output level, the wind turbine comprising a rotor coupled to a rotor blade having an adjustable blade pitch, the method comprising:
receiving a power reference signal in a de-rated mode where a requested power output level is less than an available power level;
determining whether the available power level is above or below the rated power level, and when the available power level is below the rated power level, setting the blade pitch to a pitch value based on the received power reference signal, the pitch value associated with a captured wind power that is approximately equal to the requested power output level;
controlling, based on a power curve in accordance with a determined wind speed, the produced power output level to the requested power output level by adjusting a load torque provided to the rotor by a generator coupled to the rotor wherein, when the requested power output level is greater than the available power level, the produced output power level is controlled in accordance with a non-derated power curve, wherein, when the requested power output level is less than the available power level, the produced output power level is controlled in accordance with the non-derated power curve that is shifted to a higher wind speed, and wherein the blade pitch of the rotor is further controlled by a pitch feedback control loop that modifies the pitch value based on a difference between the produced power output level and the requested power output level; and when the available power level is above the rated power level:
setting a generator speed and load torque to provide the produced power output level that is equal to the requested power; and
controlling the blade pitch to correspond to the produced power at the requested power output level by adjusting the pitch value of the rotor.

13. A controller for a wind turbine comprising:
a processor and a memory including instructions that, when executed by the processor, cause the processor to:
receive a power reference signal that defines a requested power output level less than an available power level;
set a blade pitch of a rotor blade of the wind turbine to a pitch value based on the received power reference signal to capture wind power that is approximately equal to the requested power output level; and
control a produced power output level of the wind turbine to the requested power output level by adjusting a load torque of a generator coupled to the rotor blade; and
using a pitch feedback control loop, modify the pitch value based on a difference between the produced power output level and the requested power output level,
wherein, when the requested power output level is greater than the available power level, the produced output power level is controlled according to a power curve, and
wherein, when the requested power output level is less than the available power level, the produced output power level is controlled according to the power curve shifted to a higher wind speed.

14. A wind turbine that in operation generates power at a produced power output level, the wind turbine comprising:
a processor and a memory including instructions that, when executed by the processor, enabling the processor to receive a power reference signal that defines a requested power output level that is lower than an available power level;
a pitch system for setting a blade pitch of a rotor blade of the wind turbine to a pitch value based on the received power reference signal causing the rotor to capture a wind power that is approximately equal to the requested power output level; and
a power system for controlling the produced power output level of the wind turbine to the requested power output level by adjusting a load torque provided to the rotor by a generator coupled to the rotor,
wherein, when the requested power output level is greater than the available power level, the produced output power level is controlled according to a power curve,
wherein, when the requested power output level is less than the available power level, the produced output power level is controlled according to the power curve shifted to a higher wind speed, and
wherein the processor uses a pitch feedback control loop to modify the pitch value based on a difference between the produced power output level and the requested power output level.

* * * * *